US011680640B2

(12) United States Patent
Hasenkamp (10) Patent No.: US 11,680,640 B2
(45) Date of Patent: Jun. 20, 2023

(54) PARKING LOCK SYSTEM FOR A MOTOR VEHICLE (71) Applicant: DAIMLER AG, Stuttgart (DE)

(72) Inventor: Jan Hasenkamp, Allmersbach im Tal (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 201 days.

(21) Appl. No.: 17/426,314

(22) PCT Filed: Jan. 21, 2020

(86) PCT No.: PCT/EP2020/051427
§ 371 (c)(1),
(2) Date: Jul. 28, 2021

(87) PCT Pub. No.: WO2020/169294
PCT Pub. Date: Aug. 27, 2020

(65) Prior Publication Data
US 2022/0099182 A1 Mar. 31, 2022

(30) Foreign Application Priority Data

Feb. 19, 2019 (DE) ...................... 10 2019 001 189.9

(51) Int. Cl.
F16H 63/34 (2006.01)
F16H 63/30 (2006.01)
(52) U.S. Cl.
CPC ....... F16H 63/3475 (2013.01); F16H 63/304 (2013.01); F16H 2063/305 (2013.01)
(58) Field of Classification Search
CPC ............. F16H 63/3475; F16H 63/3425; F16H 63/304; F16H 2063/305
See application file for complete search history.

(56) References Cited

U.S. PATENT DOCUMENTS 6,481,556 B1 * 11/2002 Haupt ................. F16H 63/3491
192/219.5
6,688,448 B2 2/2004 Giefer et al.

FOREIGN PATENT DOCUMENTS

CN 201588928 U 9/2010
CN 103649603 A 3/2014
(Continued)

OTHER PUBLICATIONS

International Search Report dated May 15, 2020 in related/corresponding International Application No. PCT/EP2020/051427.

(Continued)

Primary Examiner — Lori Wu
(74) Attorney, Agent, or Firm — Patent Portfolio Builders PLLC (57) ABSTRACT A parking lock system for a motor vehicle has a housing, a drive shaft couplable to a wheel of the motor vehicle, a locking element for non-rotatably connecting the drive shaft to the housing, an actuating element for actuating the locking element, a first adjusting disc and a second adjusting disc, which are both arranged rotatably around a common axis of rotation. The system also has an adjusting device for a rotational adjustment of the first adjusting disc, a first actuator coupled to the actuating element and to the second adjusting disc. The adjusting device transmits an actuating force from the first adjusting disc, via the second adjusting disc, first actuator, and actuating element to the locking element. The parking lock system has at least one spring device, which has a first end supported at least indirectly with respect to the first adjusting disc, and a second end supported at least indirectly with respect to the second adjusting disc.

7 Claims, 4 Drawing Sheets (56) References Cited

FOREIGN PATENT DOCUMENTS

| | | |
|---|---|---|
| CN | 207673844 U | 7/2018 |
| DE | 10044159 A1 | 3/2002 |
| DE | 10212038 A1 | 10/2003 |
| DE | 102014000772 A1 | 7/2015 |
| DE | 102018006667 A1 | 2/2020 |
| FR | 2988800 A1 | 10/2013 |

OTHER PUBLICATIONS

Office Action created Dec. 6, 2019 in related/corresponding DE Application No. 10 2019 001 189.9.
Written Opinion dated May 15, 2020 in related/corresponding International Application No. PCT/EP2020/051427.
Office Action dated Mar. 14, 2022 in related/corresponding CN Application No. 202080015379.7.

\* cited by examiner

PARKING LOCK SYSTEM FOR A MOTOR VEHICLE

BACKGROUND AND SUMMARY OF THE INVENTION

Exemplary embodiments of the invention relate to a parking lock system for a motor vehicle.

A parking lock system for a motor vehicle is already known from DE 10 2014 000 772 A1, having a housing, having a drive shaft that can be coupled to a wheel of the motor vehicle, having a locking element provided for non-rotatably connecting the shaft to the housing, having an actuating element provided to actuate the locking element, having a first adjusting disc and a second adjusting disc, which are both arranged rotatably around a common axis of rotation, having an adjusting device for a rotational adjustment of the first adjusting disc, having a first actuator coupled to the actuating element and to the second adjusting disc, wherein the adjusting device is provided for transmitting an actuating force from the first adjusting disc, via the second adjusting disc, via the first actuator and via the actuating element to the locking element.

Parking lock systems are known from DE 100 44 159 A1 and DE 102 12 038 A1, in which, in addition, a spring device is provided, which has a first end that is supported at least indirectly with respect to the first adjusting disc, and a second end which is supported at least indirectly with respect to the second adjusting disc.

Exemplary embodiments of the invention are directed to providing a particularly simple, in particular structurally simple and operationally reliable parking lock system.

The invention is based on a parking lock system for a motor vehicle, having a housing, a drive shaft that can be coupled to a wheel of the motor vehicle, a locking element provided for non-rotatably connecting the drive shaft to the housing, an actuating element provided for actuating the locking element, a first adjusting disc and a second adjusting disc, both of which are arranged rotatably around a common axis of rotation, an adjusting device for rotationally adjusting the first adjusting disc, a first actuator which is coupled to the actuating element and to the second adjusting disc, wherein the adjusting device is provided for transmitting an actuating force from the first adjusting disc, via the second adjusting disc, via the first actuator and via the actuating element to the locking element.

It is further assumed that the parking lock system has at least one spring device having a first end supported at least indirectly relative to the first adjusting disc, and a second end supported at least indirectly relative to the second adjusting disc. Preferably, the drive shaft has, in particular, a parking gear, wherein the locking element is formed, in particular, by a pawl provided to engage the parking gear. Preferably, the actuating element is formed, in particular, by a locking detent. However, another binding that would appear sensible to a person skilled in the art would also be conceivable. Preferably, the first actuator is coupled, in particular, directly to the second adjusting disc and/or directly to the actuating element. It is conceivable that the parking lock system has exactly one actuator, wherein the spring device is then supported, in particular, with a first end directly opposite the first adjusting disc and is supported with a second end directly opposite the second adjusting disc. In this way, an advantageously simple and compact parking lock system can be provided. In particular, a simple drive can be implemented by means of the rotatably mounted adjusting discs. This advantageously enables a cost-effective development and manufacture of the parking lock system. Furthermore, the parking lock system is, due to a small number of components, advantageously easy to maintain and not susceptible to faults. In particular, several components can be designed as sheet metal parts and thus simple manufacture can be achieved.

A "parking lock system" is to be understood in particular as a system provided for locking a motor vehicle transmission, in particular an automatic transmission, in an engaged state such that at least one output shaft of the motor vehicle transmission is blocked and a motor vehicle is secured against rolling away in a parked state. The engaged state corresponds in particular to a P state of the motor vehicle transmission. In a disengaged state, the parking lock system is provided to release the motor vehicle transmission. The disengaged state corresponds in particular to an nP state of the motor vehicle transmission. The motor vehicle transmission preferably has a parking lock gear for this purpose. In this context, a "parking lock gear" is to be understood, in particular, as a gearwheel having toothing on its periphery and which is provided for coupling to a locking element, in particular a pawl, which is at least partially fixed to the housing. Preferably, the locking element is provided to set the parking lock gear fixed to the housing in an engaged state of the parking lock system. In this context, a "pawl" is to be understood, in particular, as an element that can be pivoted between two operating positions and which forms at least one pawl tooth, which is designed to correspond to the toothing of the parking lock gear and, for insertion of the parking lock, is provided to engage positively in the toothing of the parking lock gear. Preferably, the pawl is coupled to the parking lock gear in a first operating position. In the engaged state, the pawl is in the first operating position. Preferably, the pawl is decoupled from the parking lock gear in a second operating position. In the disengaged state, the pawl is in the second operating position. The pawl is preferably actuated by an actuating element, in particular a pawl actuating element. An "actuating element" is to be understood, in particular, as a positive locking element provided to actuate the pawl and to move the pawl at least between two operating positions. Preferably, the actuating element is designed as a cone-shaped element which, by means of an axial displacement along the longitudinal direction, is provided to displace, in particular to pivot, another element, in particular the pawl, by means of its cone surface in a direction which is orthogonal to the longitudinal direction. In this context, "non-rotatably connected to the housing" is to be understood, in particular, as a vehicle-fixed connection, in particular a fixed connection with respect to a vehicle body. A non-rotatable connection of two rotatably mounted elements means in the context of the invention that the two elements are arranged coaxially with respect to each other and are connected to each other in such a way that they rotate at the same angular velocity. A non-rotatable connection of a rotatably mounted element to a housing means that the element is connected to the housing in such a way that it cannot be rotated with respect to the housing. A non-rotatable connection of two elements does not preclude the two elements from being axially displaced relative to each other.

A "spring device" is to be understood in particular as a device provided for storing resulting tensioning energy by means of an interlocking device by elastic deformation of a spring. Preferably, the spring device releases the tensioning energy upon unlocking. The spring device is further provided to create redundancy to a drive unit. In particular, in the event of a failure of a drive unit, the spring device advantageously enables the parking lock system to be moved from the disengaged state to the engaged state. Particularly advantageously, the redundancy serves for the operational safety of the motor vehicle. The spring device has a spring, in particular a compression spring. In particular, the spring is provided to be compressed in the spring device. Preferably, the spring device is coupled to a first actuator and a second actuator and/or to a first adjusting disc and a second adjusting disc. An "actuator" is to be understood, in particular, to mean a component provided for transmitting at least one actuating force, in particular in the longitudinal direction, wherein the actuator is moveably arranged. Preferably, the first actuator is formed in one piece. Preferably, the parking lock system has a force transmission unit for transmitting the actuating force from the spring device to the actuating element. A "force transmission unit" is intended to mean, in particular, a unit that transmits the actuating force at least from the spring device to the actuating element, wherein the force transmission unit is provided in at least one operating state for buffering an actuating force. In this context, an "actuating force" is intended to mean, in particular, a force with which the actuating element is actuated in order to adjust the locking element. Preferably, the actuating element transmits the actuating force at least partially to the locking element via its conical surface. The actuating force preferably acts along the longitudinal direction and is converted by the actuating element into a movement orthogonal to the longitudinal direction.

In this context, an "adjusting disc" is to be understood in particular as a disc-shaped component, in particular a circular disc-shaped component, which is provided for adjusting the actuating element, in particular via at least one actuator. In particular, the component is provided for changing a position of the actuating element, in particular by a rotary movement of the adjusting disc. Preferably, the adjusting disc is provided to be driven by means of a drive unit to perform a rotational movement. Preferably, the adjusting disc is provided for direct coupling with an actuator. In particular, the parking lock system has at least one drive unit. The drive unit is at least provided to rotate the first adjusting disc. The drive unit is preferably provided to apply the actuating force. The actuating force is transmitted from the drive unit to the actuating element by means of the spring device and the force transmission unit. The drive unit can be designed as a unit comprising a rack and pinion or a worm and worm wheel. "Provided" should be understood in particular to mean specially designed and/or equipped. The fact that an object is provided for a specific function should be understood to mean that the object fulfils and/or executes this certain function in at least one application and/or operating state.

In accordance with the invention, it is proposed that the parking lock system have a second actuator that is free to pivot relative to the first actuator and is arranged so as to be displaceable in a longitudinal direction arranged perpendicularly to the common axis of rotation, and is coupled directly to the first actuator by means of a spring device. Preferably, the second actuator is arranged to be translationally displaceable in the longitudinal direction relative to the first actuator. Particularly preferably, the first actuator is arranged to be translationally displaceable in the longitudinal direction relative to the second actuator. Particularly preferably, a spring force of the spring of the spring device acts on the first actuator and on the second actuator. In particular, the second actuator has at least one recess provided for guiding and mounting the second actuator in a manner fixed to the housing. The recess is designed as an elongated hole. The elongated hole is preferably provided for receiving a screw fixed to the housing and/or a bolt fixed to the housing. The first actuator preferably has at least one flat first sheet metal strip. In particular, the second actuator has at least one flat second sheet material strip. A "flat sheet metal strip" is to be understood, in particular, as a plate-shaped component, wherein the sheet metal strip has a length in the longitudinal direction which is a multiple of a width and a height of the sheet metal strip, and the sheet metal strip has a flat surface on at least two opposite sides. Preferably, the sheet metal strip has a basic cuboid shape. Preferably, the sheet metal strip is formed from a metallic material. Advantageously, the sheet metal strip can be stamped out of a metal sheet. In principle, the sheet metal strip can also be formed from a fiber composite material. By "arranged in parallel", it is to be understood, in particular, that the planes of the sheet metal strip are arranged in parallel to one another. This advantageously enables cost-effective development and production of the parking lock system. Furthermore, the parking lock system is advantageously easy to maintain and not susceptible to faults due to a small number of components. Particularly advantageously, in particular at least the first actuator and the second actuator are manufactured as simple stamped-bent components, preferably from sheet metal, which in particular enables low component costs. Particularly advantageously, the parking lock system is designed to be particularly simple, in particular constructively simple, and operationally reliable.

It is further proposed that the parking lock system have a switching element which, in at least one operating state, is provided for non-rotatably coupling the first adjusting disc and the second adjusting disc to each other. Preferably, the switching element is provided for non-rotatably coupling, in particular locking, the first adjusting disc to the second adjusting disc in at least one operating state. A "switching element" is to be understood to mean, in particular, a component provided for coupling at least two further components to one another. The switching element is arranged, in particular, on the second adjusting disc. The switching element is preferably arranged in a translationally displaceable manner. Preferably, in at least one operating state, the switching element couples the first adjusting disc to the second adjusting disc. Particularly preferably, the switching element prevents a relative movement between the first adjusting disc and the second adjusting disc in at least one operating state. Preferably, the switching element has at least one locking slide which, in the at least one operating state, is provided to engage, parallel to the common axis of rotation of the adjusting discs, in at least one first interlocking contour of the first adjusting disc and in at least one second interlocking contour corresponding to the first interlocking contour. The locking slide is formed, in particular, by an extension that extends in parallel to the common axis of rotation of the adjusting discs from a base body of the switching element. The switching element also has an unlocking means. The unlocking means is provided for moving the switching element in at least one operating state in such a way that the switching element does not engage in an interlocking contour of at least one of the adjusting discs. The unlocking means is designed, in particular, as an electromagnet, in particular as a solenoid. The switching element enables an advantageously simple interlocking of the adjusting discs. In particular, an advantageously simple releasable interlocking of the adjusting discs can be achieved. Alternatively, it is conceivable that the switching element is arranged between the actuators when two actuators are used, in particular a first actuator and a second actuator, and locks them in at least one operating state. In this way, in particular, a coupling of two rotationally arranged adjusting discs can be achieved via a displaceable unlocking element.

Furthermore, it is proposed that the switching element have at least one solenoid acting in the direction of the common axis of rotation and arranged coaxially to the common axis of rotation. Preferably, the solenoid is provided in at least one operating state for a, in particular translational, displacement of the locking slide of the switching element. Preferably, the solenoid is provided in at least one operating state for moving the locking slide out of at least one interlocking contour of at least one of the adjusting discs and thus in particular for releasing a relative movement between the adjusting discs. In this way, in particular, an advantageously simple and fast actuation of the switching element can be achieved. In particular, a solenoid plunger can be arranged in line with the axis of rotation of an interlocking element, such as in particular a locking disc of the switching element, whereby the interlocking element moves exclusively rotationally relative to the solenoid plunger. In this way, the release point is less susceptible to geometric tolerances. In particular, inexpensive solenoids, in particular with a stroke of only 2 mm, can be used.

It is further proposed that the second adjusting disc be directly coupled to the first actuator, wherein a rotational movement of the second adjusting disc is converted into a longitudinal movement of the first actuator in a longitudinal direction. Preferably, the first actuator has a tab provided to be received by a receptacle of the adjusting disc in a positive-locking manner. Preferably, the receptacle of the adjusting disc is formed by a jigsaw connection. Preferably, the second actuator is coupled to the first actuator, wherein a movement of the second actuator is transmitted, in particular, to the first actuator. In this way, in particular, an advantageously direct coupling can be achieved. In particular, a number of components can be kept low.

It is further proposed that the first adjusting disc be directly coupled to a second actuator, wherein a rotational movement of the first adjusting disc is converted into a longitudinal movement of the first actuator in the longitudinal direction.

Preferably, the first actuator has a tab provided to be received by a receptacle of the second adjusting disc in a positive locking manner. Preferably, the receptacle of the second adjusting disc is formed by a jigsaw connection. Preferably, the first actuator is detachably coupled to the second actuator, wherein a movement of the second actuator is, in particular, transmitted to the first actuator, wherein the first actuator can, in particular, move independently of the second actuator. In this way, an advantageously direct coupling can in particular be achieved. In particular, a number of parts can be kept low.

It is further proposed that the first actuator be non-rotatably and axially fixedly connected to a first support device for the spring device, and the second actuator is non-rotatably and axially fixedly connected to a second support device for the spring device. Preferably, a first end of the spring device bears against the first support device and a second end of the spring device bears against the second support device. In particular, an "end of the spring device" is to be understood to mean an outermost point of the spring device in a direction perpendicular to the diameter of the spring device. Preferably, a wire is bent and/or abraded at the ends of the spring device. The first support device and the second support device thus provide an advantageously flat support surface. This enables an advantageous force transmission of a spring force of the spring device to the first actuator and to the second actuator. In this context, a "support device" is to be understood, in particular, as a device provided for providing a support surface. Preferably, the support device is provided for transmission of force from the spring device to one of the actuators. Preferably, the support device is also provided for guiding the actuators. Particularly preferably, in particular according to the invention, the spring device is arranged surrounding the first actuator and the second actuator. In principle, however, another arrangement of the spring device which appears sensible to a person skilled in the art would also be conceivable. Preferably, the spring device is formed as a hollow cylinder, wherein the first actuator and the second actuator extend through an opening in the spring device. In this way, in particular, advantageous support of the spring device on the actuators can be achieved. In particular, an advantageous transmission of force can be achieved in this way.

Preferably, the longitudinal direction forms an actuating direction of the actuating element. Preferably, the actuating element is moved in parallel to the longitudinal direction, in particular translationally, to actuate the locking element. In this way, in particular, an advantageous transmission of a movement of the first and/or second adjusting disc towards the first and/or second actuator can be achieved. It is further proposed that the second adjusting disc comprise a recess provided for receiving a first extension of the first actuator. Preferably, the first actuator comprises a first extension formed as a tab, which is provided to be received by the recess of the adjusting disc in a positive-locking manner. Preferably, the recess of the adjusting disc is substantially cylindrical, in particular circular, wherein the recess together with the first extension forms in particular a two-dimensional ball joint. Preferably, the second actuator is coupled to the first actuator, wherein a movement of the second actuator is transmitted to the first actuator. In this way, in particular, an advantageously direct coupling can be achieved. In particular, a number of components can be kept low. In particular, a hinge connection can be implemented in a simple manner. Preferably, a toothing is also provided on the first adjusting disc, in which a drive engages. However, the drive can also be implemented in other ways, such as by means of a slot nut attached to the adjusting disc, which engages in a groove of a controller cylinder. In the proposed solution, the parking lock system preferably comprises few components that are very easy to manufacture. Furthermore, sheet-metal, precision-stamped components, which are easy to manufacture, can be used. This means, in particular, that no further elements are required for a hinge connection. In particular, an advantageous hinge connection can be implemented, in particular between two sheet metal components, wherein in particular one part is a round component which is surrounded by the other component in a positive-locking manner.

Further advantages arise from the following description of the figures. In the figures, an exemplary embodiment of the invention is depicted. The figures, the description of figures and the claims contain numerous features in combination. The person skilled in the art will expediently also consider the features individually and combine them to form useful further combinations.

BRIEF DESCRIPTION OF THE DRAWING FIGURES

Here are shown.

DETAILED DESCRIPTION

FIGS. 1 to 4 show a parking lock system 10 for a motor vehicle. The parking lock system 10 is designed as part of a motor vehicle transmission for a motor vehicle (not depicted in more detail). The motor vehicle transmission is designed as an automatic transmission.

The parking lock system 10 is provided to lock the motor vehicle transmission at least in an engaged state, in particular in a P state. If the motor vehicle transmission is locked by means of the parking lock system 10, no torque can be transmitted between an input shaft and an output shaft of the motor vehicle transmission. The parking lock system 10 is provided to prevent the motor vehicle from rolling away unintentionally in a parked state. In a disengaged state, in particular in an nP state, the parking lock is provided to release the motor vehicle transmission. In the disengaged state of the parking lock system 10, a torque can be transmitted between the input shaft and the output shaft of the motor vehicle transmission.

The parking lock system 10 comprises a parking lock gear 31 and a drive shaft 12, on which the parking lock gear 31 is non-rotatably arranged. The parking lock system 10 has the drive shaft 12, which can be coupled to a wheel of the motor vehicle. The drive shaft 12 is formed as a shaft of the motor vehicle transmission. The parking lock gear 31 has a toothing. The toothing is arranged on a periphery of the parking lock gear 31. The parking lock system 10 has a locking element 13, which is formed by a locking pawl. In particular, the locking element 13 is formed as a flat component. The locking element 13 is depicted schematically in FIG. 1 and can in principle also have a different shape and/or position. The locking element 13 is provided to engage in a positive-locking manner in the toothing of the parking lock 31 to engage the parking lock system 10. The locking element 13 is provided to non-rotatably connect the drive shaft 12 to a housing 11. For positive-locking contact with the toothing of the parking lock gear 31, the locking element 13 forms a locking tooth which is not depicted further. The locking tooth is designed as a positive-locking element. The locking tooth substantially has a contour corresponding to tooth spaces of the toothing of the parking lock gear 31. The locking element 13 can be moved between two operating positions. A first operating position of the locking element 13 is designed as a locking position. In the locking position of the locking element 13, the parking lock system 10 is in an engaged state. In the engaged state of the parking lock system 10, the locking element 13 engages with its locking tooth in a tooth space of the toothing of the parking lock gear 31 in order to lock it. The second operating position of the locking element 13 is designed as a release position. In the release position of the locking element 13, the parking lock system 10 is in a disengaged state. In the disengaged state of the parking lock system 10, the locking element 13 is arranged with its locking tooth spaced apart from the parking lock gear 31. The parking lock gear 31 is free to rotate relative to the locking element 13 in the disengaged state of the parking lock system 10. The operating positions of the locking element 13 designed as a locking position and the operating positions of the locking element 13 designed as a release position are designed as maximum operating positions of the locking element 13.

Figure 1:
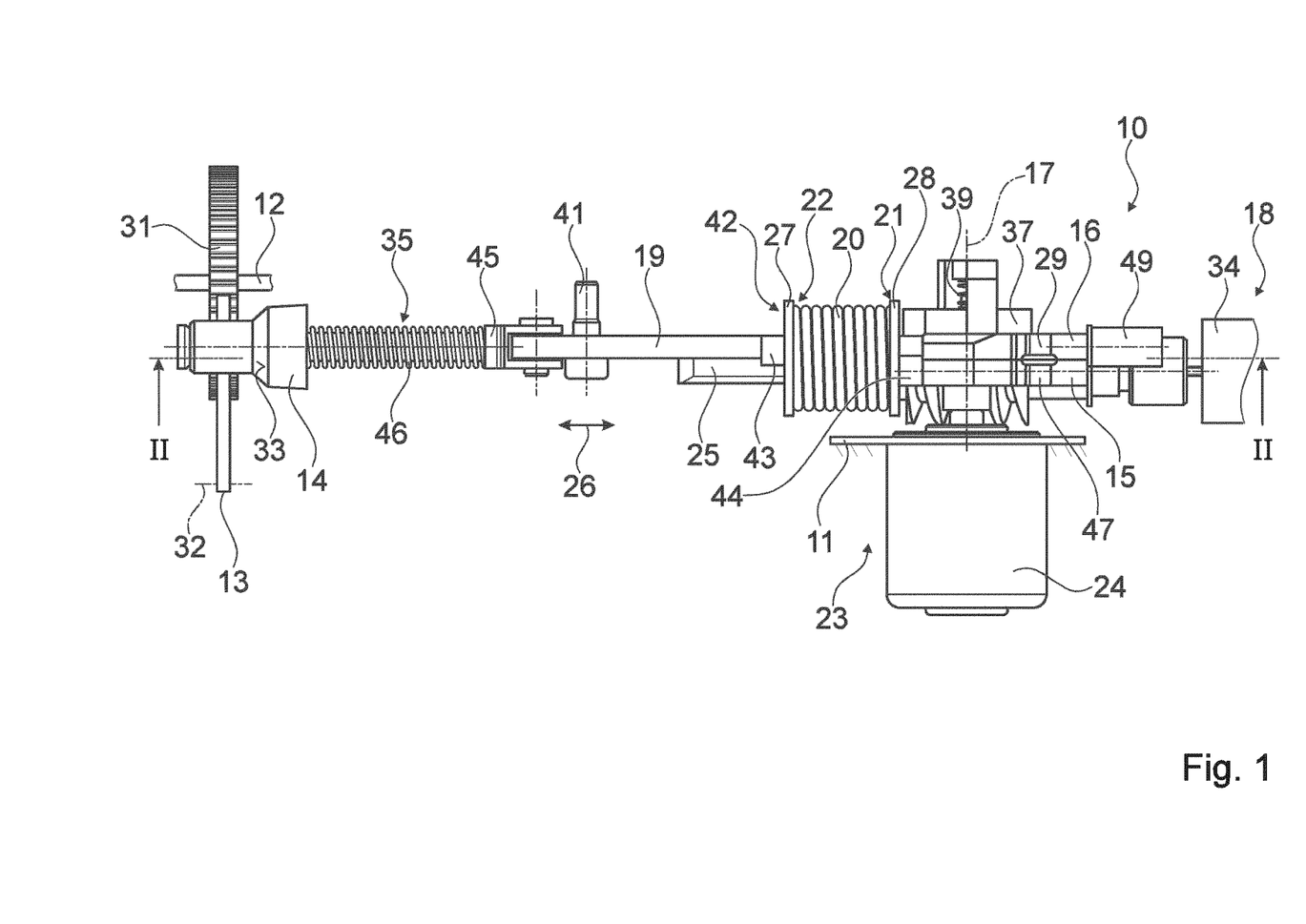
FIG. 1 a top view of the parking lock system according to the invention in normal operation in a disengaged state, FIG. 2 a schematic sectional view of the parking lock system according to the invention along the section line II-II, FIG. 3 the parking lock system according to the invention, having a first adjusting disc, having a second adjusting disc and having a hidden solenoid in a perspective view, and FIG. 4 the parking lock system according to the invention in a redundant operation in an engaged state, in a schematic side view.
Figure 2:
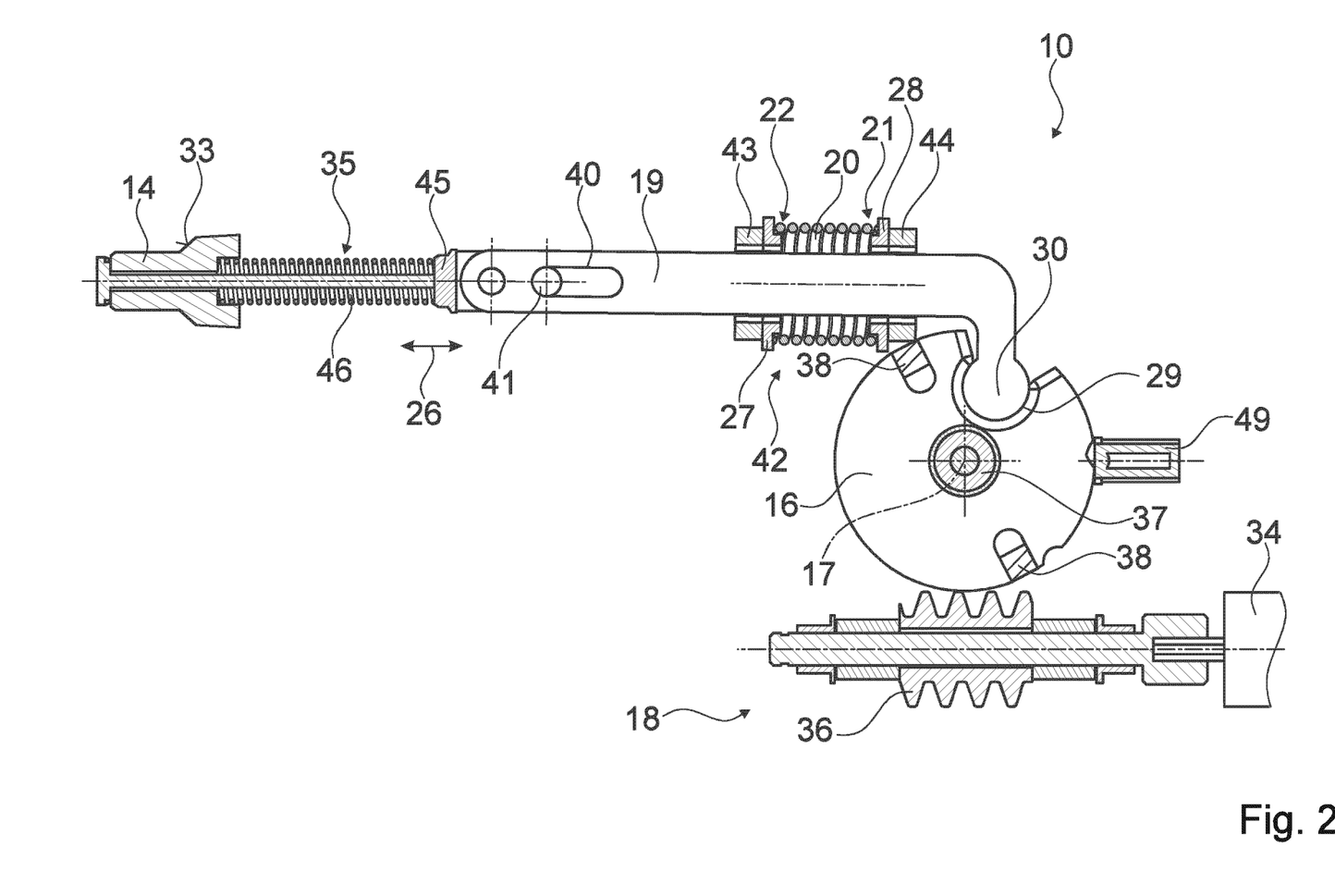

The locking element 13 is rotatably mounted, in particular to a limited extent, relative to a housing 11 of the parking lock system 10, in particular a motor vehicle transmission housing, via an axis of rotation 32. The parking lock system 10 has the housing 11. The housing 11 forms a housing 11 of the motor vehicle. The locking element 13 is thereby rotatably mounted with respect to the housing 11 via a bearing element (not depicted in greater detail). The bearing element forms the axis of rotation 32. The locking element 13 can be pivoted between its locking position and its release position via the axis of rotation 32. The parking lock system 10 comprises a spring element (not depicted in more detail), which is provided to hold the locking element 13 in its release position. For this purpose, the spring element is arranged to exert a spring force on the locking element 13, which pulls or pushes the locking element 13 into its release position. The locking element 13 has an actuating region. The actuating region is formed as a concave region. The actuating region is formed on a flat side of the locking element 13. The actuating region is provided on a side of the locking element 13 opposite the locking tooth. The actuating region is provided such that an actuating force for moving the locking element 13 to its locking position is introduced into the locking element 13 via the actuating region.

For actuating the locking element 13, the parking lock system 10 has an actuating element 14. The actuating element 14 is cone-shaped. The actuating element 14 is formed by an actuating cone. The actuating element 14 is provided for actuating the locking element 13. The actuating element 14 is formed as a positive-locking element and is provided for deflecting the locking element 13 into its locking position. The actuating element 14 has a conical surface 33, which is provided to come into direct contact with the actuating region of the locking element 13 for adjusting the locking element 13. A side with the smallest diameter of the actuating element 14 faces the locking element 13. The actuating element 14 is mounted along a longitudinal direction 26 in a displaceable manner. The longitudinal direction 26 runs in parallel to the axis of rotation 32. When displaced along the longitudinal direction 26, the actuating element 14 is provided to cause the locking element 13 to rotate around the axis of rotation 32. When displaced along the longitudinal direction 26 in the direction of the locking element 13, the side with the smallest diameter of the actuating element 14 initially comes into contact with the actuating region. If the actuating element 14 is displaced further along the longitudinal direction 26 in the direction of the locking element 13, a successively wider area with an increasing diameter of the conical surface 33 comes into contact with the actuating region and thus exerts the actuating force on the locking element 13, which presses the locking element 13 with its locking tooth in the direction of the parking lock gear 31. The actuating force preferably acts along the longitudinal direction 26 and is converted by the actuating element 14 into a movement orthogonal to the longitudinal direction 26. The parking lock system 10 further comprises a counter element, not further depicted, which is provided for the actuating element 14 to be supported thereon for actuating the locking element 13. The counter element is arranged at a distance from the locking element 13, in particular in the region of the actuating region of the locking element 13. To move the locking element 13 into its locking position, the actuating element 14 is inserted between the actuating region of the locking element 13 and the counter element. The counter element is arranged fixed to the housing, whereby the actuating element 14 can be supported on the counter element during actuation of the locking element 13.

The parking lock system 10 has an adjusting device 18, which has a drive unit 34. The parking lock system 10 comprises a spring device 20. The parking lock system 10 comprises a force transmission unit 35, which is provided for transmitting a drive force from the drive unit 34 to the actuating element 14.

The adjusting device 18 has a drive unit 34 designed as an electric motor and a worm gear 36 driven by the drive unit 34. The drive unit 34 has an engine axis of rotation extending in parallel to the longitudinal direction 26. In principle, it would be conceivable that a transmission is also arranged between the drive unit 34 and the worm gear 36. The parking lock system 10 also has a first adjusting disc 15 and a second adjusting disc 16, which are both rotatably arranged around a common axis of rotation 17. The common axis of rotation 17 of the first adjusting disc 15 and the second adjusting disc 16 is arranged perpendicular to the longitudinal direction 26. The adjusting device 18 is provided for rotational adjustment of the first adjusting disc 15. For this purpose, the first adjusting disc 15 has, in a defined circumferential region, a toothing provided for meshing with a worm toothing of the worm gear 36 of the drive unit 34 of the adjusting device 18. The toothing is formed, in particular, by a punched-out toothed arc segment, wherein the radius of the toothed arc segment can, in particular, be freely selected. By means of the drive unit 34, the first adjusting disc 15 can be rotated via the worm gear 36. The first adjusting disc 16 is detachably coupled to the second adjusting disc 16.

Figure 3:
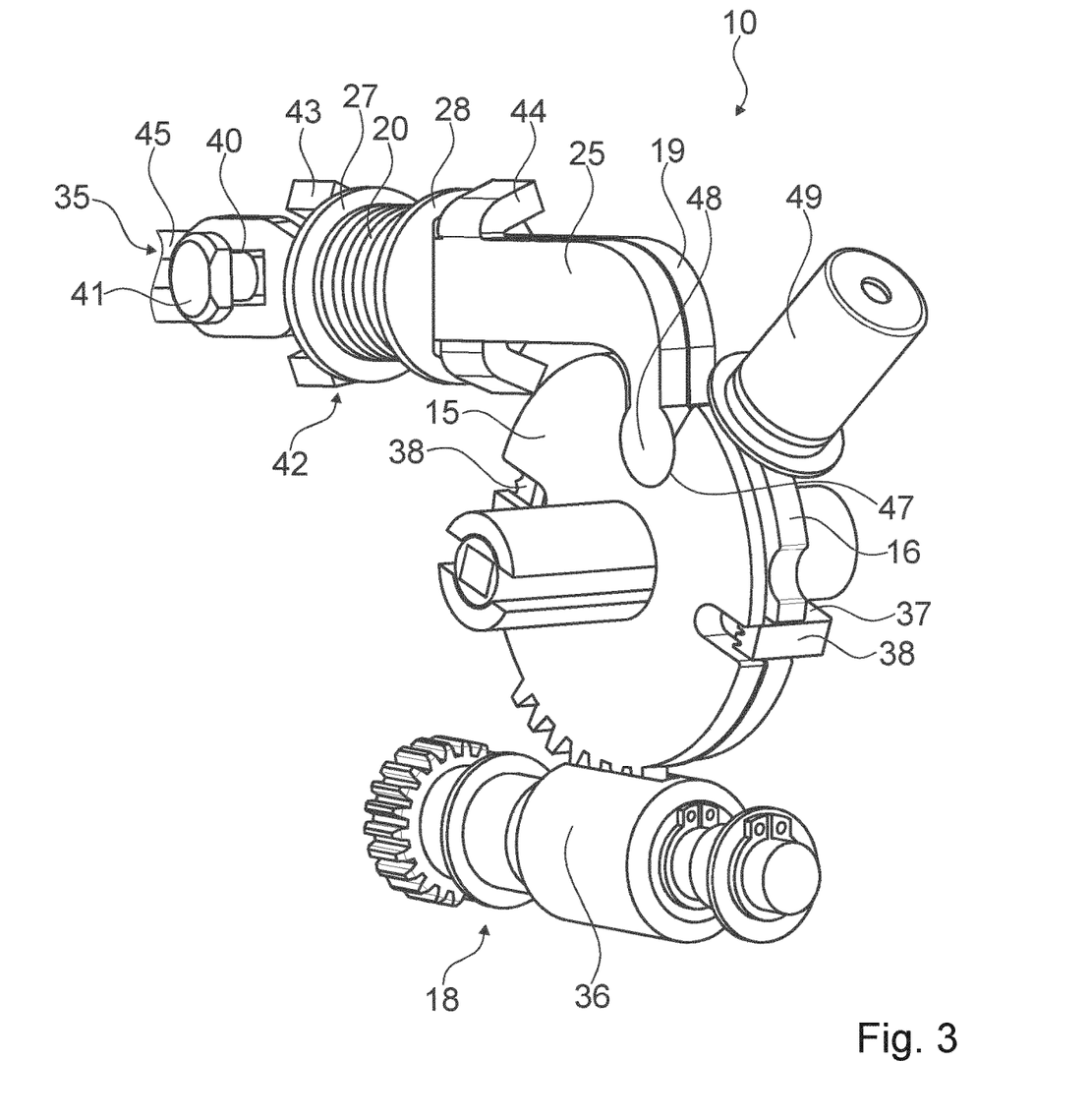

The parking lock system 10 has a switching element 23 which, in at least one operating state, is provided for non-rotatably connecting the first adjusting disc 15 and the second adjusting disc 16 to each other. In a regular operating state, the switching element 23 is provided for non-rotatably connecting the first adjusting disc 15 and the second adjusting disc 16 to each other. The switching element 23 has an interlocking element 37, which is formed by a locking disc. The interlocking element 37 is, in particular, T-shaped, having two overlapping points. The interlocking element 37 is arranged in parallel, in particular coaxially, to the first adjusting disc 15 and the second adjusting disc 16. The interlocking element 37 has at least one, in particular at least two and preferably exactly two, locking slides 38 which, in the regular operating state, are provided for engaging, parallel to the common axis of rotation 17 of the adjusting discs 15, 16, in a first interlocking contour of the first adjusting disc 15 and in a second interlocking contour, corresponding to the first interlocking contour, of the second adjusting disc 16. The locking slides 38 are each formed by an extension, which extend parallel to the common axis of rotation 17 of the adjusting discs 15, 16 from a base body of the interlocking element 37 of the switching element 23. The switching element 23 thus secures the connection between the adjusting discs 15, 16 as long as the overlap at the interlocking contours exists and the locking slides 38 extend axially over both adjusting discs 15, 16. The adjusting device 18 engages at the first adjusting disc 15 and rotates the second adjusting disc 16 via the coupling by means of the locking. The switching element 23 has a solenoid 24, which acts in the direction of the common axis of rotation 17 and which is arranged coaxially to the common axis of rotation 17. For actuation, the solenoid 24 displaces the interlocking element 37 parallel to the axis of rotation 17, such that the overlaps are dissolved and the locking slide 38 is at least pushed out of the interlocking contour of the first adjusting disc 15. In an actuated state of the solenoid 24, the adjusting discs 15, 16 are rotatable relative to one another. A return spring 39 ensures that the interlocking element 37 is moved back into the initial position as soon as the adjusting device 18 has brought the first adjusting disc 15 back into overlapping contact with the second adjusting disc 16 after the solenoid 24 has been triggered. This occurs, in particular, by moving the first adjusting disc 15 into the P position. The coupling is thus restored and the adjusting device 18 can continue to be used in standard operation.

The spring device 20 is formed by a spring. The spring device 20 comprises a first end 21 and a second end 22. The spring device 20 has a first end 21, which is indirectly supported with respect to the first adjusting disc 15, and a second end 22, which is indirectly supported with respect to the second adjusting disc 16. The spring device 20 is designed as a compression spring. Preferably, the spring device 20 is formed from a wire. The wire of the spring device 20 is bent and/or abraded at the ends 21, 22. The spring device 20 is particularly intended to be compressed. A spring force of the spring device 20 acts in the longitudinal direction 26. The parking lock system 10 is intended to store a resulting tensioning energy by means of an interlocking device by elastically deforming the spring device 20. The spring device 20 releases the tensioning energy when unlocked by means of the solenoid 24. The spring device 20 is further provided to provide redundancy to the drive unit 34. In particular, in the event of a failure of the drive unit 34, the spring device 20 enables the parking lock system 10 to be advantageously moved from the disengaged state to the engaged state.

The parking lock system 10 has a first actuator 19. The spring device 20 is supported on the first actuator 19. The parking lock system 10 has a second actuator 25. The second actuator 25 is arranged so as not to pivot relative to the first actuator 19 and displaceable in the longitudinal direction 26. The second actuator 25 is directly coupled to the first actuator 19 by means of the spring device 20. The second actuator 25 is arranged to be translationally displaceable relative to the first actuator 19 in the longitudinal direction 26. The second actuator 25 is arranged so as not to pivot relative to the first actuator 19 in the longitudinal direction 26. The first actuator 19 and the second actuator 25 are preferably each formed in one piece. The first actuator 19 has a flat first sheet metal strip. The second actuator 25 has a flat second sheet metal strip. The flat second sheet metal strip is arranged in parallel to the flat first sheet metal strip. The parking lock system 10 has a contact region. The first actuator 19 and the second actuator 25 are arranged to overlap in the contact region in at least one operating state. The first actuator 19 and the second actuator 25 contact each other in the contact region.

Particularly preferably, a spring force of the spring device 20 acts on the first actuator 19 and on the second actuator 25. The first end 21 of the spring device 20 is supported against the first actuator 19. The second end 22 of the spring device 20 is supported against the second actuator 25. In normal operation, the spring device 20 ensures that the first and second actuator 19, 25 are permanently braced against each other when driven via the engagement on the first adjusting disc 15.

The first actuator 19 has at least one second recess 40. The second recess 40 is provided for guidance and mounting of the first actuator 19 while still being fixed to the housing. The second recess 40 is formed as an elongated hole. The elongated hole is preferably provided for receiving a screw 41 fixed to the housing.

The first actuator 19 is coupled to the actuating element 14 and to the second adjusting disc 16. The second adjusting disc 16 is directly coupled to the first actuator 19, wherein a rotational movement of the second adjusting disc 16 is converted into a longitudinal movement of the first actuator 19 in a longitudinal direction 26. The second adjusting disc 16 has a first recess 29 provided to receive a first extension 30 of the first actuator 19. The first actuator 19 has a first extension 30 formed as a tab. The extension 30 has a plate-shaped, in particular circular, extension at its free end. The first extension 30 is provided to be received in a positive-locking manner by the first recess 29 of the second adjusting disc 16. The first recess 29 of the second adjusting disc 16 has a substantially cylindrical, in particular circular, outer contour, wherein the first recess 29 together with the first extension 30 forms, in particular, a two-dimensional ball joint. The first recess 29 has a gap in the second adjusting disc 16, which gap extends over the entire first actuator 19 in a direction of the common axis of rotation 17 and extends in a peripheral direction over an angular section, in particular relative to the common axis of rotation 17, of at least 20°.

The second actuator 25 is coupled to the first adjusting disc 15. Furthermore, the second actuator 25 is coupled to the first actuator 19 in a regular operating state. The first adjusting disc 15 is directly coupled to the second actuator 25, wherein a rotational movement of the first adjusting disc 15 is converted into a longitudinal movement of the second actuator 25 in a longitudinal direction 26. Preferably, moreover, a rotational movement of the first adjusting disc 15 is converted into a longitudinal movement of the first actuator 19 in the longitudinal direction 26. The first adjusting disc 15 has a third recess 47, which is provided to receive a second extension 48 of the second actuator 25. The second actuator 25 has a second extension 48 formed as a tab. The extension 48 has a plate-shaped, in particular circular, extension at its free end. The second extension 48 is provided to be received in a positive-locking manner by the third recess 47 of the first adjusting disc 15. The third recess 47 of the first adjusting disc 15 has a substantially cylindrical, in particular circular, outer contour, wherein the third recess 47 together with the second extension 48 forms in particular a two-dimensional ball joint. The third recess 47 of the first adjusting disc 15 is formed analogously to the first recess 29 of the second adjusting disc 16. In principle, however, another binding which would appear sensible to a person skilled in the art would also be conceivable.

The parking lock system 10 has a guide unit 42. The guide unit 42 is arranged in the contact region. The guide unit 42 is provided to allow a defined relative movement between the first actuator 19 and the second actuator 25 in the longitudinal direction 26, and to prevent a further relative movement in a direction perpendicular to the longitudinal direction 26. The guide unit 42 at least partially surrounds the first actuator 19 and the second actuator 25. In particular, the guide unit 42 is arranged independently of the housing. The parking lock system 10 has a first support device 27 and a second support device 28.

The guide unit 42 has the first support device 27 and the second support device 28 spaced apart from the first support device 27. The guide unit 42 comprises exactly two support devices 27, 28. The first support device 27 is arranged spaced apart from the second support device 28 in the longitudinal direction 26. The second support device 28 is formed identically to the first support device 27. The spring device 20 is arranged between the first support device 27 and the second support device 28. The first actuator 19 is non-rotatably and axially fixedly connected to the first support device 27 for the spring device 20. Furthermore, the second actuator 25 is non-rotatably and axially fixedly connected to the second support device 28 for the spring device 20. The spring device 20 is supported with the first end 21 indirectly relative to the first adjusting disc 15 via the second actuator 25, and with the second end 22 indirectly relative to the second adjusting disc 16 via the first actuator 19.

The first support device 27 is formed as a sheet metal disc arranged perpendicularly to the longitudinal direction 26. The sheet metal disc has a recess, which is provided for receiving the first actuator 19 and the second actuator 25. The second support device 28 is also formed as a sheet metal disc arranged perpendicularly to the longitudinal direction 26, wherein the sheet metal disc is formed identically to the first support device 27. The sheet metal disc is formed as a round plate. The sheet metal disc has a diameter corresponding at least to the diameter of the spring device 20. The recess has a rectangular shape. The first support device 27 is fixedly connected to the first actuator 19, at least in the longitudinal direction 26. The second support device 28 is fixedly connected to the second actuator 25, at least in the longitudinal direction 26. The second end 22 of the spring device 20 is supported on the first support device 27. The first end 21 of the spring device 20 is supported on the second support device 28. The spring device 20 is arranged surrounding the first actuator 19 and the second actuator 25. The spring device 20 is formed as a hollow cylinder, wherein the first actuator 19 and the second actuator 25 extend through the spring device 20.

The first actuator 19 has at least one first support tab 43. The first support tab 43 is provided to support the first support device 27 against the first actuator 19 in the longitudinal direction 26. The first support tab 43 is formed angled, in particular bent, with respect to the first sheet metal strip. The first support tab 43 is provided to provide a lateral guide for the second actuator 25. The first support tab 43 is formed integrally with the first sheet metal strip. In principle, the first support tab 43 can also be joined to the first sheet metal strip by a material bond, in particular by a welding process, or by force-fitting. Furthermore, the second actuator 25 has at least one second support tab 44. The second support tab 44 is fixedly connected to the second actuator 25. The second support tab 44 is provided to support the second support device 28 against the second actuator 25 in the longitudinal direction 26. The second support tab 44 is formed angled, in particular bent, with respect to the second sheet metal strip. The second support tab 44 is provided to provide a lateral guide for the first actuator 19. The second support tab 44 is formed integrally with the second sheet metal strip.

The force transmission unit 35 is provided for transmitting the actuating force from the first actuator 19 to the actuating element 14. In at least one operating state, the force transmission unit 35 is provided to buffer the actuating force. The force transmission unit 35 has a further actuator 45. The force transmission unit 35 has a further spring 46, which is configured as a compression spring. The further spring 46 at least partially surrounds the further actuator 45. The further actuator 45 is coupled to the first actuator 19. In particular, the further actuator 45 is fixedly connected to the first actuator 19. The actuating element 14 is arranged on the further actuator 45 so as to be moveable relative to the further actuator 45 in the longitudinal direction 26. The further spring 46 is provided for positioning the actuating element 14 in an outer region of the further actuator 45 in at least one operating state. In an operating state in which the locking element 13 cannot engage in the toothing of the parking lock gear 31 due to a position of the parking lock gear 31 and at the same time the actuating force is exerted on the actuating element 14, the actuating element 14 is displaced in the direction of the first actuator 19. The displacement of the actuating element 14 in the direction of the first actuator 19 compresses the further spring 46. The tensioning energy resulting from the compression of the further spring 46 is released when the locking element 13 is able to engage in the toothing of the parking lock gear 31 due to a position of the parking lock gear 31, wherein the actuating force is transmitted to the actuating element 14.

The adjusting device 18 is provided to transmit an actuating force from the first adjusting disc 15, via the second adjusting disc 16, via the first actuator 19, and via the actuating element 14 to the locking element 13. The adjusting device 18 is provided for transmitting an actuating force from the first adjusting disc 15, via the second adjusting disc 16, via the first actuator 19, via the force transmission unit 35, and via the actuating element 14 to the locking element 13.

Furthermore, the parking lock system 10 has a detent 49. The detent 49 ensures that the parking lock system 10 remains securely in the positions P and nP in each case if it is not actuated. For this purpose, the second adjusting disc 16 has grooves corresponding in particular to the positions, into which the detent 49 can engage in the corresponding position.

The parking lock system 10 can be operated in normal operation or in redundant operation. In normal operation of the parking lock system 10, the first adjusting disc 15 and the second adjusting disc 16 and thus also the first actuator 19 and the second actuator 25 are rigidly coupled to each other via the switching element 23 in the disengaged state and the engaged state of the parking lock system 10. In this case, both adjusting discs 15, 16 are non-rotatably coupled to each other via the closed switching element 23. The spring device 20 is permanently compressed in the normal mode. In normal operation, the parking lock system 10 can be transferred from the disengaged state to the engaged state by actuating the actuating element 14 by means of the driving force of the adjusting device 18 acting on the first actuator 19 and transmitted from the second adjusting disc 16 to the first actuator 19, wherein the actuating elements 19, 25, the force transmission unit 35, and the actuating element 14 are moved in the longitudinal direction 26 towards the locking element 13 and exert the actuating force on the locking element 13. In normal operation, the parking lock system 10 can be transferred from the engaged state to the disengaged state by actuating the actuating element 14 by means of the driving force of the adjusting device 18 acting on the first actuator 19 and transmitted from the second adjusting disc 16 to the first actuator 19, wherein the actuators 19, 25, the force transmission unit 35, and the actuating element 14 are moved away from the locking element 13 in the longitudinal direction 26. Thus, in particular, by means of the adjusting device 18, the first adjusting disc 15 is rotated and thus also the second adjusting disc 16. As a result, in particular the first actuator 19 is moved in the longitudinal direction 26. The actuating element 14 is moved via the first actuator 19 and acts on the locking element 13.

Figure 4:
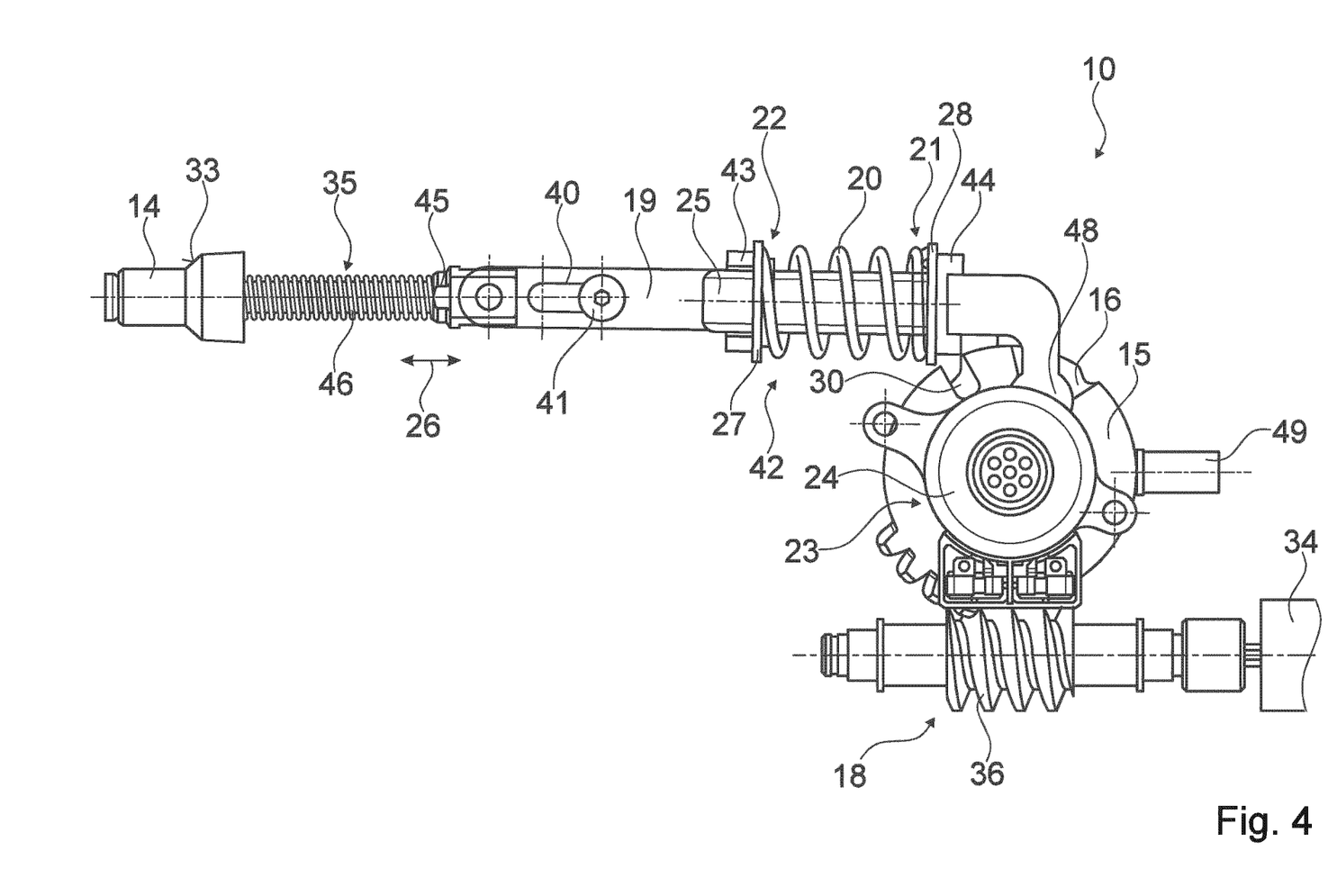

In the redundant operation of the parking lock system 10, the first actuator 19 and the second actuator 25 are rigidly coupled to each other in the disengaged state of the parking lock system 10 via the adjusting discs 15, 16 and the switching element 23. In the redundant operation of the parking lock system 10, the first actuator 19 and the second actuator 25 are decoupled from each other in the engaged state of the parking lock system 10. In the redundant operation, the spring device 20 is compressed in a disengaged state of the parking lock system 10 and decompressed in an engaged state of the parking lock system 10. In the redundant operation, the parking lock system 10 can be transferred from the disengaged state to the engaged state by actuating the actuating element 14 by means of the spring device 20, wherein the first adjusting disc 15 and the second adjusting disc 16 are decoupled from each other by means of a release of the switching element 23 by means of the solenoid 24, thereby decoupling the first actuator 19 and the second actuator 25, wherein the spring device 20 decompresses. For this purpose, the switching element 23 is switched to the open position by means of the solenoid 24. The second adjusting disc 16 now rotates freely relative to the first adjusting disc 15. In this way, the first actuator 19 can also move relative to the second actuator 25. Since the spring device 20 is tensioned i.e., compressed, in the fully functional case, the spring device 20 can now move the first actuator 19 due to the decoupling and the first adjusting disc 15 can remain stationary. The spring device 20 supports itself on the second actuator 25 via the first adjusting disc 15 against the drive unit 34. The decompression of the spring device 20 causes the first actuator 19, the force transmission unit 35, and the actuating element 14 to move in the longitudinal direction 26 towards the locking element 13 and exert the actuating force on the locking element 13. The redundant operation can be used particularly advantageously in the event of a failure of the drive unit 34 in normal operation, since the motor vehicle can be secured against unintentional rolling away in a parked state despite a fault in the parking locking system 10. Thus, if the parking lock system 10 is to be engaged via the solenoid 24, such as in the case of a single-fault electric motor standard actuation path, the coupling of the adjusting discs 15, 16 can be disengaged by pressing the solenoid plunger on the axis of the interlocking element 37, and the second adjusting disc 16 or the first actuator 19 are moved to the P position by the bias in the spring device 20. In the engaged state, the parking lock system 10 can be transferred from the redundant operation to the normal operation by actuating the spring device 20 by means of the drive unit 34 engaging the second actuator 25 via the first adjusting disc 15, wherein the second actuator 25 is moved in the longitudinal direction 26 towards the first actuator 19 and exerts the actuating force on the spring device 20. During the transition from redundant operation to normal operation, the spring device 20 is compressed until the interlocking element 37 is moved via the return spring 39 into a coupling position in which the first adjusting disc 15 and the second adjusting disc 16 are coupled. Advantageously, this allows normal operation to be restored in the engaged state.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

REFERENCE NUMERAL LIST 10 parking lock system
11 housing
12 drive shaft
13 locking element
14 actuating element
15 first adjusting disc
16 second adjusting disc
17 axis of rotation
18 adjusting device
19 actuator
20 spring device
21 first end
22 second end
23 switching element
24 solenoid
25 actuator
26 longitudinal direction
27 first support device
28 second support device
29 first recess
30 extension
31 parking lock gear
32 axis of rotation
33 conical surface
34 drive unit
35 force transmission unit
36 worm gear
37 interlocking element
38 locking slide
39 return spring
40 second recess
41 screw
42 guide unit
43 first support tab
44 second support tab
45 actuator
46 spring
47 third recess
48 extension
49 detent

The invention claimed is:

1. A parking lock system for a motor vehicle, the parking lock system comprising:
   a housing;
   a drive shaft which is couplable to a wheel of the motor vehicle;
   a locking element configured to non-rotatably connect the drive shaft to the housing;
   an actuating element configured to actuate the locking element;
   a first adjusting disc and a second adjusting disc, which are both arranged rotatably around a common axis of rotation;
   an adjusting device configured to rotationally adjust the first adjusting disc;
   a first actuator coupled to the actuating element and the second adjusting disc, wherein the adjusting device, the first adjusting disc, the second adjusting disc, the first actuator, the actuating element, and the locking element are arranged in such a way that an actuating force is transmittable starting from the adjusting device to the first adjusting disc, from there further to the second adjusting disc, from there further to the first actuator, from there further to the actuating element, and from there further to the locking element;
   at least one spring device, which has a first end supported at least indirectly with respect to the first adjusting disc and a second end supported at least indirectly with respect to the second adjusting disc; and
   a second actuator, which is free to pivot relative to the first actuator and is arranged in a displaceable manner in a longitudinal direction arranged perpendicularly to the common axis of rotation, and which is directly coupled to the first actuator by the spring device.

2. The parking lock system of claim 1, further comprising:
   a switching element which, in at least one operating state, is configured to non-rotatably connect the first adjusting disc and the second adjusting disc to each other.

3. The parking lock system of claim 2, wherein the switching element has at least one solenoid acting in a direction of the common axis of rotation and which is arranged coaxially with respect to the common axis of rotation.

4. The parking lock system of claim 1, wherein the second adjusting disc is directly coupled to the first actuator, wherein a rotational movement of the second adjusting disc is converted into a longitudinal movement of the first actuator in the longitudinal direction.

5. The parking lock system of claim 1, wherein the first adjusting disc is directly coupled to the second actuator, wherein a rotational movement of the first adjusting disc is converted into a longitudinal movement of the first actuator in the longitudinal direction.

6. The parking lock system of claim 1, wherein the first actuator is non-rotatably and axially fixedly connected to a first support device for the spring device, and the second actuator is non-rotatably and axially fixedly connected to a second support device for the spring device.

7. The parking lock system of claim 1, wherein the second adjusting disc has a first recess configured to receive a first extension of the first actuator.

* * * * *